Patented Feb. 18, 1947

2,416,134

UNITED STATES PATENT OFFICE 2,416,134

ROAD PAVING COMPOSITION

William W. Allen, Ambler, Pa., assignor to West Bank Oil Terminal, Inc., Philadelphia, Pa., a corporation of Delaware No Drawing. Application July 23, 1943, Serial No. 495,892

4 Claims. (Cl. 252—311.5)

This invention relates generally to the art of road paving compositions and more particularly to improvements in the composition of and in the method of producing stable bituminous emulsions suitable for use as a coating for mineral aggregate to bind the same firmly together as a compact course or strata of a bituminous concrete roadway.

An all-purpose asphaltic cement statisfactory for use as a bonding and coating agent for mineral aggregate should have the following properties: first, it should be able to completely coat the aggregate irrespective of the kind and condition of the aggregate, be it wet or dry, or cold or warm; second, it should have such adhesive qualities that the adhesion between the asphalt and the aggregate is not disrupted in the presence or because of water or by variations in climatic conditions; third, it should maintain the asphaltic concrete of which the pavement is formed sufficiently plastic for a long enough period of time so that the shocks and impact of traffic, instead of disrupting the pavement by rendering the aggregate discrete, compact the aggregate and distributes the traffic shock over a large area of the pavement, or, in other words, it should provide the pavement with a certain amount of resiliency and a high coefficient of "rehealing"; and fourth, it should so retard oxidation that the pavement retains its rehealing characteristic over a long period of time, the ideal asphaltic concrete being one in which the asphaltic cement is as soft as possible and yet has the capacity of resisting being "pushed" apart by traffic shocks and impacts.

Heretofore and prior to this invention various bituminous emulsions, both of the oil-in-water as well as of the water-in-oil type, have been employed with varying degrees of success as the bonding agent and coating for mineral aggregate used in the construction of roadways. However, in the use of most of these emulsions considerable difficulties have been encountered in obtaining a satisfactory bond between the mineral aggregate and the bitumen due to the presence in the aggregate of moisture which is generally incompatible with the bitumen and prevents its uniform distribution through the aggregate mass and its proper adherence to the discrete particles thereof. This difficulty is particularly pronounced in connection with the use of wet aggregate and in order to overcome it, it has been found necessary to resort to the expedient of drying the aggregate preliminarily to its mixture with the bituminous coating composition to render it free of any surface moisture.

I have found that by incorporating one or more aliphatic amines in the bituminous emulsion, irrespective of whether it be of the oil-in-water or water-in-oil type and irrespective of whether the latter type be prepared as an inverted emulsion, as for example by the procedure described in the prior United States Letters Patent No. 2,013,972, granted September 10, 1935, the characteristics and properties of the emulsion are so very materially improved that it may be employed effectively as an all-purpose bonding agent or cement for any kind of aggregate regardless whether the latter be used in its dry or wet state, or whether it be cold or warm. I have also found that the inclusion of the aliphatic amines in the emulsion renders it suitable for use as a coating and bonding agent for the mineral aggregate in those cases where it is desired to prepare a stock pile of the road paving mixture, it having been observed that when such stock pile of bituminous coated aggregate is prepared in accordance with the present invention, the individual particles of the pile do not cohere to each other although completely coated with the bituminous cement and that the mass remains discrete to such extent that the stock pile continues to be suitable for use for long periods after its initial preparation without having been affected by climatic conditions to which it may have been exposed.

I have also found that when a bituminous emulsion, either of the oil-in-water or of the water-in-oil type, prepared as hereinafter described, with an aliphatic amine as a constituent thereof, a very small amount of the amine, less than one percent by weight of the whole composition, is necessary to provide an effective coating which will not strip from the aggregate under such a severe stripping test as subjecting the coated aggregate to boiling water for a period of ten minutes. In this regard, tests have shown that the intermixing of an amine with bitumen or bituminous material, as distinguishing from a bituminous emulsion, provides a composition which while having the capacity of uniformly coating mineral aggregate, lacks the important property of withstanding the stripping test, the latter being indicative of the ability of the coated aggregate to resist parting of the asphalt from the aggregate under adverse climatic conditions, such as rain, snow and the like, and this is true even though a greater percentage of the amine is intermixed with the bitumen or bituminous material. Accordingly, an important object of the present invention is to provide a bituminous emulsion prepared as described hereinafter and which is characterized in that it includes as a constituent thereof a small quantity of an aliphatic amine of the class hereinafter specified.

As has been indicated above, bituminous emulsions which have been prepared in accordance with the present invention and in which are included aliphatic amines of the types hereinafter more particularly specified are materially improved not only in their own physical characteristics and attributes as a bonding agent in the preparation of road paving compositions, but also serve to materially improve the paving composition per se as well as render the preparation thereof more facile, economical and stable.

While I know from observations and tests made by me that the use of these aliphatic amines materially increases the effectiveness of the bituminous emulsion for its intended purpose, the mechanism of the action or reaction of the amines with the other ingredients of the emulsion is not definitely known and accordingly no attempt is made herein to express definitely what action or reaction, if any, is obtained when the emulsion is prepared in accordance with the present invention. Rather, I merely venture as my opinion that the presence of the amines in the emulsion apparently has the effect, when combined with asphalt or a cut-back containing asphalt, of so reducing the inter-facial tension between the asphalt and water as to impart to the former an affinity for the mineral aggregate to be coated which is at least greater than the affinity of water to such aggregate, and that the amine acts in some manner as an intermediate bonding agent between the bitumen and the aggregate. This opinion is largely based upon my observation that in the use of the amine-treated bituminous emulsion, there is obtained a most satisfactory and stable adherence of the asphalt to the aggregate, whether in dry or wet state, and that when the amine-treated bituminous emulsion is applied to wet aggregate, all of the water on the aggregate is replaced by the asphalt at the same time that the latter attaches itself directly to the aggregate, there being no tendency for the coating to be stripped or lifted from the stone, and the coating, consequently, is just as effective when applied to wet stone as it is when applied to dry stone.

While it is probable that a good many of the aliphatic amines may be satisfactorily employed in the preparation of the bituminous emulsion in accordance with and for the purposes of the present invention, I have found that the most satisfactory results are obtained through the use of the aliphatic amines of the class having chains of from five to twenty carbon atoms, this class including not only the saturated amines, but also those having one or more unsaturated linkages. Of the saturated aliphatic amines, I have found that hexadecyl amine, octadecyl amine and dodecyl amine may be most advantageously employed, while of the unsaturated amines octadecadienyl amine and octadecenyl amine are the most desirable.

Preferably, in the production of a water-in-oil type of bituminous emulsion treated with an amine in accordance with the present invention, the basic material employed is hard asphalt having a melting point of from 115° and 130° F. and a penetration of 85 to 100, this material being dissolved in or thinned with naphtha to form a cut-back of the requisite liquidity. This cut-back may be purchased as such or it may be prepared, as just indicated, by dissolving the hard asphalt in naphtha, the cut-back constituting from 85 to 95 percent by weight of the complete or final emulsion.

The ingredients which enter into the preparation of the water-in-oil type bituminous emulsion and their relative proportions by weight are as follows:

| | Per cent |
|---|---|
| Cut-back | 85 to 95 |
| Fatty acid | 0.1 to 2 |
| Fatty acid soap | 0.1 to 2 |
| Water | 4 to 12 |
| Salt of a heavy metal | 0.03 to 1 |
| Amine | Less than 1 |

The fatty acid of the foregoing list of ingredients, may be either saturated or unsaturated, of which stearic and oleic are examples, and it may be any one or more of the following: pine fatty acids (tall oil), coconut oil fatty acids, linseed fatty acid, sardine oil fatty acid, as well as the naphthenic fatty acids derived from petroleum.

The fatty acid soap should be water soluble, such as the sodium, potassium or ammonium fatty acid soaps, while the heavy metal salt should be one which reacts with the water soluble soap to form one that is insoluble in water, such as aluminum sulphate, iron chloride or lead nitrate.

The amine is of the type hereinbefore specified, preferably a straight chain aliphatic amine having from five to twenty carbon atoms, of which specific examples have already been given. Several different methods of procedure may be employed in compounding the bituminous emulsion of the present invention, the particular procedure being dependent on the nature of the final use of the bituminous preparation and on the materials that are available at the point of its manufacture. In accordance with one method, assuming that all the essential ingredients are immediately available, the cut-back is first thinly heated following which the fatty acid, soap solution, heavy metallic salt and the amine are successively introduced thereinto, the whole mixture being then passed through a colloid mill from which it is delivered into a storage tank.

In accordance with a second method of procedure, all of the ingredients above listed may be mixed together to form a concentrate which is adapted for subsequent mixing with additional cut-back to so produce a completed emulsion ready for immediate use on the job. In preparing this concentrate, the materials initially mixed with the cut-back are increased some 5 to 10 times the amount normally used in accordance with the first method, and the resulting concentrate is then mixed with additional cut-back amounting to 5 to 10 times that initially included in the concentrate. This method is quite satisfactory and is recommended where it is desired to make use of a central plant for manufacture of a concentrate to be blended later with additional cut-back.

Still another procedural method useful in the case where naphtha but not cut-back is immediately available is to introduce into a stream of naphtha all of the aforementioned ingredients other than the cut-back, in the proportions stated, to produce a concentrate which has substantially all of the properties of the concentrate prepared in accordance with the second method of procedure. When the naphtha concentrate is diluted with cut-back, the resultant emulsion is similar in all material respects to the final emulsions prepared as hereinbefore described.

Finally, if desired all of the ingredients may be mixed together in the proportions hereinbefore stated without the inclusion of any naphtha or cut-back to provide a concentrate which may be combined, as desired, with the requisite quantity of cut-back or bitumen dissolved in naphtha to produce the final bituminous emulsion for use in coating the mineral aggregate.

In the use of the final bituminous emulsion prepared in accordance with any of the foregoing methods, all of which result in the production of a water-in-oil type of emulsion, the amount of the emulsion employed for coating the aggregate will depend to great extent on the asphalt content of the composition. Thus, where a more viscous material is required, as in the case of surface treating of a roadway, the asphalt content of the coating emulsion preferably should be from 78 to 82% of the total weight thereof, and about 0.25 to 0.30 gallon of the emulsion should be used per square yard of pavement, followed by a cover of stone chips spread at the rate of about 30 lbs. per square yard.

In the case of a plant mix of base course aggregate employing stone ranging from 1 to 1.5 inches in size, a satisfactory asphalt coating for such stone is obtained by using the coating emulsion at the rate of 3 to 4 percent of the total weight of the stone. Thus, for each ton of stone, approximately 75 to 100 lbs. of coating emulsion of 80% asphalt content would provide an effective coating.

For a top course employing ¼ to ½" stone aggregate, a satisfactory coating is obtained through the use of approximately 100 to 125 lbs. of the emulsion per ton of aggregate, which represents a coating percentage of from 4 to 5 percent.

As I have pointed out hereinbefore, the inclusion of the specified amines in the emulsion produced in accordance with the present invention materially improves the properties and characteristics of the emulsion irrespective of whether it be formed as an oil-in-water emulsion or as a water-in-oil emulsion. In this connection, where an oil-in-water emulsion is desired, it may be obtained by modifying the procedure hereinbefore described to include the cut-back into the mixture by passing it through a colloid mill after the addition of the soap into the mixture, the metallic salt being omitted from the preparation in such case.

Also, a satisfactory oil-in-water type emulsion may be obtained wherein bitumen of a penetration of from 200 to 300 is employed, in which case the constituents of the emulsion and the relative proportions by weight would be:

|  | Per cent |
|---|---|
| Bitumen (heated to fluidity) | 50 to 70 |
| Fatty acid soap | 0.1 to 2 |
| Water | 30 to 50 |
| Amine | Less than 1 |

If desired, instead of preparing an emulsion with amine present therein as a constituent, a non-aqueous mixture for hot application purposes may be prepared of the following ingredients in the approximate proportions by weight as indicated:

|  | Per cent |
|---|---|
| Bitumen (heated to fluidity) | 90 to 98 |
| Fatty acid | 0.1 to 2 |
| Fatty acid soap | 0.1 to 2 |
| Heavy metal salt | 0.03 to 1 |
| Amine | Less than 1 |

In the foregoing formula, in lieu of introducing the fatty acid and the heavy metal salt as separate ingredients of the mixture, they may be introduced in the form of the reaction product thereof, that is, as a water-insoluble metallic soap, for example, aluminum stearate, which is the reaction product of sodium stearate and aluminum sulphate. There are several methods of obtaining this non-aqueous mixture, one of which is by introducing into the mixture the water-insoluble reaction product while in solution with the fatty acid, and another being to prepare the mixture as an emulsion using aqueous solutions of the fatty acid soap and of the heavy metal salt, and thereafter removing the water by dehydration so as to obtain as the final product a non-aqueous mixture of the ingredients including the amine. This non-aqueous mixture is satisfactory for hot application as a coating for the aggregate and may be applied to the aggregate by plant mixing with a pug mill or by spraying it directly upon the surface of the aggregate when the latter is laid down and spread during the road building operation.

It will be understood, of course, that the proportions hereinbefore recited and the procedural steps hereinbefore described are not at all fixed and may be varied within reasonable limits without departing from the general principles or real spirit of the present invention, and accordingly it will be further understood that it is intended to claim the invention broadly, as well as specifically, as indicated by the appended claims.

What is claimed as new and useful is:

1. A bituminous emulsion of the water-in-oil type prepared for use in the form of such emulsion as an all-purpose coating for mineral aggregate including as final constituents thereof liquefied bitumen, an aliphatic amine containing not less than five carbon atoms, and a water insoluble fatty acid soap in colloidal state derived as the reaction product of an aqueous solution of a fatty acid soap mixed with a salt of a heavy metal capable of reacting with the soap to render it water insoluble in the presence of the said liquefied bitumen, said amine being included in free state and in an amount, less than 1 percent by weight of said emulsion, sufficient to increase the affinity of the bitumen for the mineral aggregate above that of the bitumen contained in an amine-free water-in-oil emulsion formed of the same constituents as aforesaid.

2. A bituminous emulsion of the water-in-oil type prepared for use in the form of such emulsion as an all-purpose coating for mineral aggregate including as final constituents thereof liquefied bitumen, an aliphatic amine containing not less than five carbon atoms, and a water insoluble metallic soap in colloidal state derived as the reaction product of an aqueous solution of a fatty acid soap mixed with a salt of a heavy metal capable of reacting with the soap to render it water insoluble in the presence of the said liquefied bitumen, said amine being included in free state and in an amount, less than 1 percent by weight of said emulsion, sufficient to increase the affinity of the bitumen for the mineral aggregate above that of the bitumen contained in an amine-free water-in-oil emulsion formed of the same constituents as aforesaid.

3. A bituminous emulsion of the water-in-oil type prepared for use in the form of such emulsion as an all-purpose coating for mineral aggregate including as final constituents thereof liquefied bitumen, an aliphatic amine containing not less than five carbon atoms, and an aluminium soap in colloidal state formed in the presence of said liquefied bitumen as the reaction product of an aqueous solution of a fatty acid soap mixed with aluminium sulphate, said amine being included in free state and in an amount, less than 1 percent by weight of said emulsion, sufficient to increase the affinity of the bitumen for the mineral aggregate above that of the bitumen contained in an amine-free water-in-oil emulsion formed of the same constituents as aforesaid.

4. A bituminous emulsion of the water-in-oil type prepared for use in the form of such emulsion as an all-purpose coating for mineral aggregate including as final constituents thereof liquefied bitumen, a higher fatty acid, an aliphatic amine containing not less than five carbon atoms, and an aluminium soap in colloidal state formed in the presence of said liquefied bitumen as the reaction product of an aqueous solution of a fatty acid soap mixed with aluminium sulphate, said amine being included in free state and in an amount, less than 1 percent by weight of said emulsion, sufficient to increase the affinity of the bitumen for the mineral aggregate above that of the bitumen contained in an amine-free water-in-oil emulsion formed of the same constituents as aforesaid.

WILLIAM W. ALLEN.

REFERENCES CITED

The following references are of record in the file of this patent:

UNITED STATES PATENTS

| Number | Name | Date |
| --- | --- | --- |
| 2,015,865 | Muller | Oct. 1, 1935 |
| 2,278,684 | Asbury et al. | Apr. 7, 1942 |
| 2,244,685 | Fritz | June 10, 1941 |
| 2,191,295 | Dohse | Feb. 20, 1940 |
| 2,317,959 | Johnson | Apr. 27, 1943 |
| 2,320,644 | Nill | June 1, 1943 |
| 2,013,972 | Sadtler | Sept. 10, 1935 |

FOREIGN PATENTS

| Number | Country | Date |
| --- | --- | --- |
| 848,911 | French | Nov. 9, 1939 |
| 847,829 | French | Oct. 17, 1939 |
| 429,548 | British | May 31, 1935 |